(12) United States Patent
Yamazaki et al.

(10) Patent No.: US 11,059,081 B2
(45) Date of Patent: Jul. 13, 2021

(54) SUBSURFACE SOIL PURIFICATION METHOD

(71) Applicants: TAKENAKA CORPORATION, Osaka (JP); TAKENAKA CIVIL ENGINEERING & CONSTRUCTION CO., LTD., Tokyo (JP)

(72) Inventors: Yuji Yamazaki, Inzai (JP); Takaaki Shimizu, Inzai (JP); Nobuyasu Okuda, Inzai (JP); Yasuhide Furukawa, Inzai (JP); Tomohiro Nakashima, Inzai (JP); Haruka Kiyotomo, Inzai (JP); Kazuhiro Mukai, Inzai (JP); Kaoru Inaba, Inzai (JP); Koudai Mae, Inzai (JP); Masafumi Funakawa, Tokyo (JP); Ai Hasegawa, Tokyo (JP); Keisuke Omura, Tokyo (JP); Kota Tanabe, Tokyo (JP)

(73) Assignees: TAKENAKA CORPORATION, Osaka (JP); TAKENAKA CIVIL ENGINEERING & CONSTRUCTION CO., LTD., Tokyo (JP)

(*) Notice: Subject to any disclaimer, the term of this patent is extended or adjusted under 35 U.S.C. 154(b) by 0 days.

(21) Appl. No.: 16/329,735

(22) PCT Filed: Aug. 29, 2017

(86) PCT No.: PCT/JP2017/031015
§ 371 (c)(1),
(2) Date: Feb. 28, 2019

(87) PCT Pub. No.: WO2018/043507
PCT Pub. Date: Mar. 8, 2018

(65) Prior Publication Data
US 2019/0193129 A1  Jun. 27, 2019

(30) Foreign Application Priority Data

Aug. 29, 2016 (JP) .............................. JP2016-167232

(51) Int. Cl.
*B09C 1/02* (2006.01)
*B09C 1/08* (2006.01)
(Continued)

(52) U.S. Cl.
CPC .................. *B09C 1/02* (2013.01); *B09C 1/08* (2013.01); *B09C 1/10* (2013.01); *B09C 1/002* (2013.01)

(58) Field of Classification Search
CPC ........................................................ B09C 1/02
See application file for complete search history.

(56) References Cited

U.S. PATENT DOCUMENTS 5,954,452 A * 9/1999 Goldstein ............... B01F 5/043
166/250.01
2010/0227381 A1* 9/2010 Hoag ........................ B09C 1/08
435/262.5
(Continued)

FOREIGN PATENT DOCUMENTS

EP    0370409 A1 *  5/1990 ............... B09C 1/10
EP    1361002 A2   11/2003
(Continued)

OTHER PUBLICATIONS

Machine translation of EP-0370409-A1 (Year: 2020).*
(Continued)

*Primary Examiner* — Janine M Kreck
(74) *Attorney, Agent, or Firm* — Alston & Bird LLP

(57) ABSTRACT

A subsurface soil purification method includes a first process of injecting a cleaning liquid, that separates a contaminant in subsurface soil from the subsurface soil and that has been warmed to a higher temperature than a groundwater tem-
(Continued)

perature, into an injection well provided in the ground, and a second process of pumping up groundwater containing the cleaning liquid, in which the contaminant separated from the subsurface soil has been dissolved, from a pumping well that is provided in the ground so as to be spaced apart from the injection well.

11 Claims, 2 Drawing Sheets

(51) Int. Cl.
*B09C 1/10* (2006.01)
*B09C 1/00* (2006.01)

(56) References Cited

U.S. PATENT DOCUMENTS

| 2013/0309758 A1* | 11/2013 | Erasmus | C05F 17/80 |
| | | | 435/262.5 |
| 2018/0043404 A1* | 2/2018 | Labbett | B09C 1/002 |

FOREIGN PATENT DOCUMENTS

| JP | 8-39083 A | 2/1996 |
| JP | 2005-040649 A | 2/2005 |
| JP | 2005-279548 A | 10/2005 |
| JP | 2007-260610 A | 10/2007 |
| JP | 2014-205086 A | 10/2014 |
| JP | 2014-205087 A | 10/2014 |
| JP | 2015-077571 A | 4/2015 |

OTHER PUBLICATIONS

WIPO Application No. PCT/JP2017/031015, PCT International Search Report and Written Opinion of the International Searching Authority dated Sep. 26, 2017.

EP 17846512.6 Exented European Search Report dated Apr. 3, 2020.

* cited by examiner

SUBSURFACE SOIL PURIFICATION METHOD

CROSS REFERENCE TO RELATED APPLICATIONS

This application is a National Stage Application, filed under 35 U.S.C. § 371, of International Application No. PCT/JP2017/031015, filed Aug. 29, 2017, which claims priority to Japanese Application No. 2016-167232, filed Aug. 29, 2016; the contents of which are hereby incorporated by reference in their entirety.

BACKGROUND

Technical Field

The present disclosure relates to a subsurface soil purification method for purifying subsurface soil.

Description of Related Art

Subsurface soil purification methods exist for purifying subsurface soil containing contaminants. For example, Japanese Patent Application Laid-Open (JP-A) No. 2014-205086 discloses a purification method for contaminated soil in which subsurface soil is purified by warming groundwater and injecting the groundwater into subsurface soil. Contaminants in the subsurface soil are effectively eluted by the groundwater, or the decomposing action of decomposer microorganisms is stimulated to decompose contaminants in the subsurface soil.

Moreover, for example, bio-purification methods exist in which an activator liquid containing a yeast extract or the like, which stimulates the decomposing action of decomposer microorganisms that decompose contaminants in subsurface soil, is injected through an injection well provided in the ground and flows into subsurface soil, such that contaminants in the subsurface soil are decomposed by the stimulated decomposer microorganisms in the subsurface soil, thereby purifying the subsurface soil.

Moreover, for example, JP-A No. 2015-77571 discloses a subsurface soil purification method in which a liquid containing a nutrient source for microorganisms and an eluent for contaminants is fed into ground contaminated by contaminants through an injection well. Some contaminants are eluted and recovered, and decomposition of contaminants by decomposer microorganisms present in the ground is also promoted.

BRIEF SUMMARY

However, since contaminants are fixed to soil particles in the subsurface soil, decomposition of contaminants by decomposer microorganisms is inefficient and purification of the subsurface soil is time-consuming. Moreover, in bio-purification methods, issues such as the decomposing action of the decomposer microorganisms being impaired by the toxicity of the contaminants arise at high contaminant concentrations.

In consideration of the above circumstances, an object of the present disclosure is to improve the efficiency of subsurface soil purification.

A first aspect of the present disclosure is a subsurface soil purification method including injecting a cleaning liquid, that separates a contaminant in subsurface soil from the subsurface soil and that has been warmed to a higher temperature than a groundwater temperature, into an injection well provided in the ground, and pumping up groundwater containing the cleaning liquid, in which the contaminant separated from the subsurface soil has been dissolved, from a pumping well that is provided in the ground so as to be spaced apart from the injection well.

In the first aspect of the present disclosure, the cleaning liquid is injected into the injection well, enabling the contaminant that is fixed to soil particles in the subsurface soil to be separated from the subsurface soil. The groundwater containing the cleaning liquid in which the contaminant that has been separated from the subsurface soil is dissolved is pumped up through the pumping well, thereby enabling the separated contaminant to be purged from the subsurface soil so as to purify the subsurface soil. Warming the cleaning liquid to a higher temperature than the groundwater temperature enables separation of the contaminant from the subsurface soil to be promoted. This enables the efficiency of purification of the subsurface soil to be improved.

A second aspect of the present disclosure is the subsurface soil purification method of the first aspect, wherein after injecting a cleaning liquid, an activator liquid that stimulates decomposition microorganisms to decompose the contaminant and that has been warmed to a higher temperature than the groundwater temperature is injected into the injection well, or decomposition microorganisms that decompose the contaminant are injected into the injection well together with the activator liquid, or a purifying liquid that decomposes the contaminant and that has been warmed to a higher temperature than the groundwater temperature is injected into the injection well.

In the second aspect of the present disclosure, the contaminant separated from the subsurface soil by injecting a cleaning liquid is decomposed by decomposer microorganisms stimulated by the activator liquid, or is decomposed by the purification liquid, thereby enabling the subsurface soil to be purified.

Injecting the activator liquid that has been warmed to a higher temperature than the groundwater temperature into the injection well enables the decomposer microorganisms to be further stimulated, thereby promoting decomposition of the contaminant, compared to cases in which the activator liquid is injected into the injection well at or below the groundwater temperature.

Moreover, injecting decomposer microorganisms through the injection well enables the number of decomposer microorganisms in the subsurface soil to be increased, thereby promoting contaminant decomposition.

Furthermore, injecting purification liquid that has been warmed to a higher temperature than the groundwater temperature into the injection well enables contaminant decomposition to be promoted compared to cases in which purification liquid is injected into an injection well at or below the groundwater temperature.

The present disclosure configured as described above enables the efficiency of subsurface soil purification to be improved.

DETAILED DESCRIPTION

Figure 1:
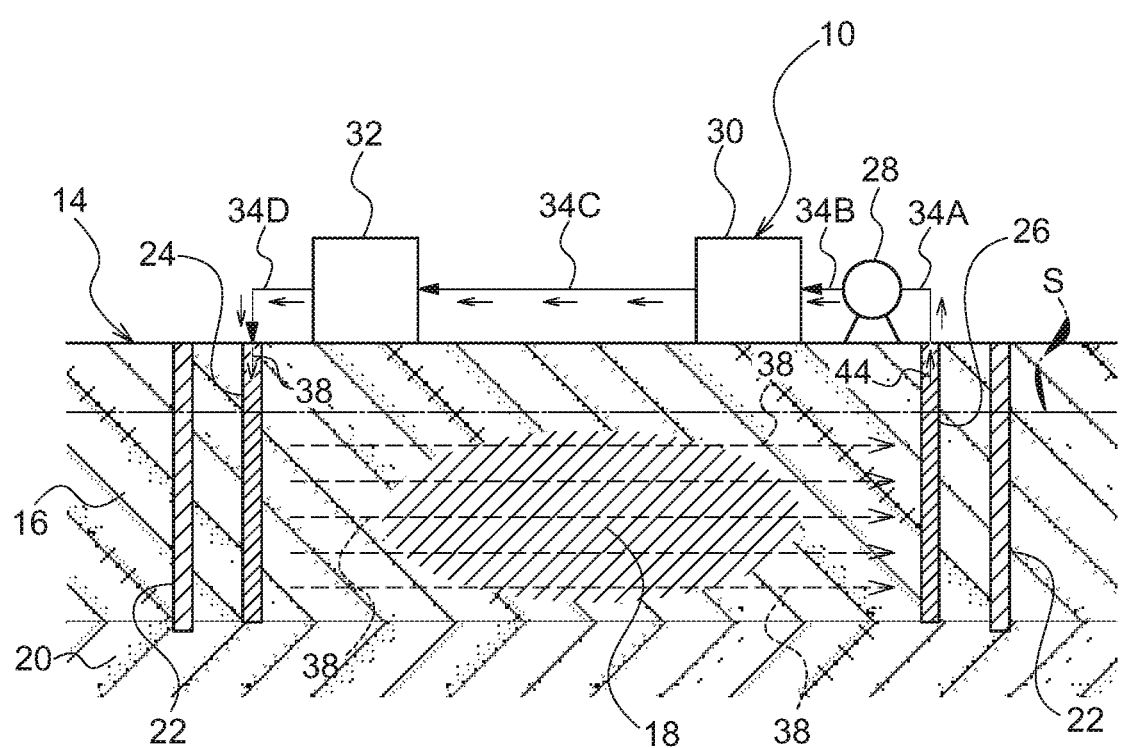
FIG. 1 is a front view cross-section illustrating a flushing purification system according to an exemplary embodiment of the present disclosure.

Explanation follows regarding an exemplary embodiment of the present disclosure, with reference to the drawings. First, explanation follows regarding a subsurface soil purification method according to an exemplary embodiment of the present disclosure. Note that explanation regarding common configuration elements represented by the same reference numerals in plural drawings is sometimes omitted.

In the subsurface soil purification method of the present exemplary embodiment, a flushing process is performed first, followed by a contaminant decomposition process. The front view cross-section in FIG. 1 illustrates a flushing purification system 10 for performing the flushing process, and the front view cross-section in FIG. 2 illustrates a contaminant-decomposing purification system 12 for performing the contaminant decomposition process.

First, explanation follows regarding the flushing purification system 10.

Figure 2:
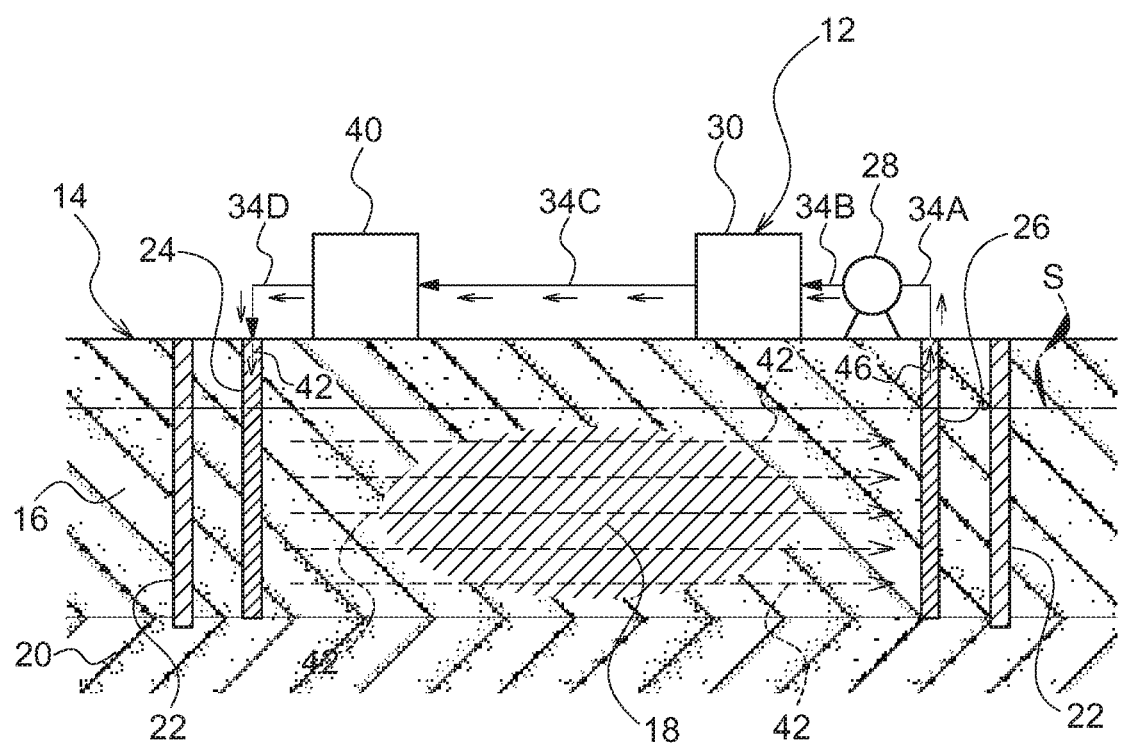
FIG. 2 is a front view cross-section illustrating a contaminant-decomposing purification system according to an exemplary embodiment of the present disclosure.

As illustrated in FIG. 1, an aquifer layer 16 is formed below a groundwater level S in ground 14. Contaminated soil 18 containing contaminants is present in the aquifer layer 16. Note that examples of contaminants include organic compounds (such as volatile organic compounds including toluene, xylene, tetrachloroethylene, trichloroethylene, cis-1, 2-dichloroethylene, chloroethylene (namely, vinyl chloride monomers), benzene, or the like, which are contained in paint, printer ink, adhesives, detergent, gasoline, thinners, or the like), heavy metal compounds, inorganic compounds, oils, and so on.

An aquiclude layer 20 with a lower permeability to water than the aquifer layer 16 is formed below the aquifer layer 16. Note that the ground 14 does not necessarily include an aquiclude layer 20.

The flushing purification system 10 is configured including a water-shielding wall 22, an injection well 24, a water pumping well 26, a pump 28, a water treatment unit 30, and a conditioning tank 32 serving as a tank for warming and conditioning cleaning liquid.

The water-shielding wall 22 is provided within the ground 14 so as to enclose the contaminated soil 18. A lower end portion of the water-shielding wall 22 is embedded in the aquiclude layer 20. The contaminated soil 18 is thereby enclosed and isolated by the water-shielding wall 22 and the aquiclude layer 20. Note that the water-shielding wall 22 may be omitted as appropriate.

The injection well 24 and the water pumping well 26 are provided spaced apart from each other within the ground 14 enclosed by the water-shielding wall 22 such that the contaminated soil 18 is disposed between the injection well 24 and the water pumping well 26. Namely, the water pumping well 26 is provided within the ground 14 so as to be spaced apart from the injection well 24.

The water pumping well 26, the pump 28, the water treatment unit 30, the conditioning tank 32, and the injection well 24 are linked together in this sequence by water feed pipes 34A, 34B, 34C, and 34D.

In the conditioning tank 32, a surfactant is mixed into treated water that has been treated in the water treatment unit 30 to generate a cleaning liquid 38. The cleaning liquid 38 is warmed in the conditioning tank 32 to a higher temperature than a normal groundwater temperature by a heater or the like provided inside the conditioning tank 32, after which the warmed cleaning liquid 38 is fed to the injection well 24. It is sufficient that the cleaning liquid 38 be warmed to a higher temperature than the normal groundwater temperature. The temperature of the cleaning liquid 38 is preferably from 20° C. to 80° C., and more preferably from 25° C. to 60° C.

Note that it is sufficient that the cleaning liquid 38 be able to separate contaminants in the contaminated soil 18 (subsurface soil) that are fixed to soil particles in the contaminated soil 18 (subsurface soil) from the contaminated soil 18 (subsurface soil). A negative-ion (namely, an anionic) surfactant, a non-ionic surfactant with an HLB value from 7 to 18, or the like may be used as the surfactant mixed into the treated water to generate the cleaning liquid 38.

Examples of negative-ion surfactants that may be employed include salts of fatty acids, polyoxyalkylene alkylether acetates, alkyl sulfates, polyoxyalkylene alkylether sulfates, polyoxyalkylene alkyl amide ether sulfates, monoglyceride sulfates, olefin sulfonates, alkane sulfonates, acylated isethionates, acylated amino acids, alkylphosphates, polyoxyalkylene alkylether phosphates, and the like.

Examples of non-ionic surfactants that may be employed include polyoxyethylene alkylethers, glycerin fatty acid esters, propylene glycol fatty acid esters, sorbitan fatty acid esters, polyoxyethylene sorbitan fatty acid esters, polyoxyethylene sorbitol tetraoleate, polyoxyethylene polyoxypropylene glycol, polyoxyethylene polyoxypropylene alkylethers, polyethylene glycol fatty acid esters, polyoxyethylene castor oils, polyglycerin fatty acid esters, alkylglycosides, and the like.

Furthermore, instead of a surfactant, a foaming agent, an admixture, an emulsifier, or the like may be mixed into the treated water to generate the cleaning liquid 38.

Examples of foaming agents that may be employed include hydrogen peroxide generators that when dissolved in water dissociate hydrogen peroxide and generate oxygen (for example percarbonates, persulfates, perborates, peracetates, hydrogen peroxide adducts of alkali metal sulfates, hydrogen peroxide adducts of alkaline earth metal sulfates, hydrogen peroxide adducts of urea, hydrogen peroxide adducts of melanin, hydrogen peroxide adducts of amino acids, alkali metal peroxides, alkaline earth metal peroxides, and the like), hydrogen peroxide, and the like.

Examples of admixtures that may be employed include methanol, ethanol, propanol, butanol, acetone, and the like.

Examples of emulsifiers that may be employed include sodium stearoyl lactylate, sucrose fatty acid esters, and the like.

Note that such a surfactant, foaming agent, admixture, emulsifier, or the like does not necessarily need to be mixed into the treated water, and the cleaning liquid 38 may be configured by treated water that has been warmed to a higher temperature than the normal groundwater temperature. Warming the cleaning liquid 38 to a higher temperature than the normal groundwater temperature enables contaminants in the contaminated soil 18 (subsurface soil) that are fixed to soil particles in the contaminated soil 18 (subsurface soil) to be separated from the contaminated soil 18 (subsurface soil).

Groundwater 44 is pumped and fed from the water pumping well 26 to the water treatment unit 30 by the pump 28. Water treatment is performed in the water treatment unit 30 to remove contaminants from the groundwater 44 containing the cleaning liquid 38 in which contaminants have been dissolved.

In the flushing process performed by the flushing purification system 10, first, the cleaning liquid 38 generated and warmed to a higher temperature than the normal groundwater temperature in the conditioning tank 32 is injected into the injection well 24, and contaminants that are fixed to soil particles in the contaminated soil 18 (subsurface soil) are separated from the contaminated soil 18 (subsurface soil) (a first process).

Then, after the first process, the groundwater 44 containing the cleaning liquid 38 in which contaminants separated from the contaminated soil 18 (subsurface soil) are dissolved is pumped from the water pumping well 26 (a second process).

Next, explanation follows regarding the contaminant-decomposing purification system 12. Explanation regarding similar configuration to that described with respect to the flushing purification system 10 (FIG. 1) is omitted from the following explanation.

As illustrated in FIG. 2, the contaminant-decomposing purification system 12 is configured including the water-shielding wall 22, the injection well 24, the water pumping well 26, the pump 28, the water treatment unit 30, and a conditioning tank 40 serving as a tank for warming and conditioning activator liquid. The contaminated soil 18 is in a state in which soil purification by the flushing process performed by the flushing purification system 10 is progressing, but the contaminated soil 18 (subsurface soil) still contains contaminants.

The water pumping well 26, the pump 28, the water treatment unit 30, the conditioning tank 40, and the injection well 24 are linked together in this sequence by the water feed pipes 34A, 34B, 34C, and 34D.

Groundwater 46 is pumped and fed from the water pumping well 26 to the water treatment unit 30 by the pump 28. Water treatment is performed in the water treatment unit 30 to remove contaminants from the groundwater 46.

In the conditioning tank 40, an activator is mixed into treated water that has been treated in the water treatment unit 30 to generate an activator liquid 42. The activator liquid 42 is warmed to a temperature higher than the normal groundwater temperature by a heater or the like provided inside the conditioning tank 40, after which the warmed activator liquid 42 is fed to the injection well 24.

It is sufficient that the activator liquid 42 stimulate the decomposing action of decomposer microorganisms that decompose contaminants present in the contaminated soil 18 (subsurface soil). For example, a hydrogen sustained release agent, an organic substance, a pH adjuster, micronutrients, trace elements, or the like may be employed as the activator that is mixed into treated water to generate the activator liquid 42.

Examples of organic substances that may be employed include formic acid, acetic acid, propionic acid, butyric acid, lactic acid, or citric acid, sodium salts, potassium salts, or calcium salts thereof, glucose, fructose, galactose, lactose, maltose, trehalose, peptone, triptone, yeast extract, humic acid, plant oils, and the like.

Examples of pH adjusters that may be employed include sodium or potassium carbonates or bicarbonates such as sodium bicarbonate, sodium carbonate, and the like, ammonium hydroxide, ammonium carbonate, sodium tripolyphosphate, sodium diphosphate, Trisodium Phosphate, and the like.

Examples of micronutrients that may be employed include vitamin B12, vitamin B1, pantothenic acid, biotin, folate, and the like.

Examples of trace elements that may be employed include Co, Zn, Fe, Mg, Ni, Mo, B, and the like.

Note that the activator liquid 42 is basically a compound containing at least one out of the organic substances and at least one out of the micronutrients described above as activators. However, other known purification agents may also be added to the activator liquid 42. The TOC concentration of a culture solution of the purification agent is preferably from 50 mg/L to 5000 mg/L, and is more preferably from 100 mg/L to 300 mg/L. However, the TOC concentration does not necessarily need to be within these values.

It is sufficient to warm the activator liquid 42 to a higher temperature than the normal groundwater temperature. The temperature of the activator liquid 42 is preferably from 20° C. to 60° C., and more preferably from 20° C. to 35° C.

In the contaminant decomposition process performed by the contaminant-decomposing purification system 12, the activator liquid 42 generated and warmed to a higher temperature than the normal groundwater temperature in the conditioning tank 40 is injected into the injection well 24. The activator liquid 42 is fed into the subsurface soil 48 contaminated soil 18, and decomposer microorganisms present in the contaminated soil 18 (subsurface soil) are stimulated by the activator liquid 42. Contaminants separated from the contaminated soil 18 (subsurface soil) in the first process are then decomposed by the decomposer microorganisms that have been stimulated by the activator liquid 42 (a third process).

Explanation follows regarding operation and advantageous effects of the subsurface soil purification method according to the present exemplary embodiment of the present disclosure.

In the flushing process of the flushing purification system 10 of the present exemplary embodiment, as illustrated in FIG. 1, the cleaning liquid 38 is injected into the injection well 24 and the cleaning liquid 38 flows into the contaminated soil 18, thereby enabling contaminants that are fixed to soil particles in the contaminated soil 18 (subsurface soil) to be separated from the contaminated soil 18 (subsurface soil). The groundwater 44 containing the cleaning liquid 38 in which the contaminants that have been separated from the contaminated soil 18 (subsurface soil) are dissolved is pumped up through the water pumping well 26, thereby enabling the separated contaminants to be purged from the contaminated soil 18 (subsurface soil) so as to purify the contaminated soil 18 (subsurface soil). Warming the cleaning liquid 38 to a higher temperature than the normal groundwater temperature enables the solubility of contaminants in the cleaning liquid 38 to be raised, promoting the separation of contaminants from the contaminated soil 18 (subsurface soil). This enables the efficiency of purification of the contaminated soil 18 (subsurface soil) to be improved.

Furthermore, in the flushing process of the flushing purification system 10 of the present exemplary embodiment, warming the cleaning liquid 38 enables the viscosity of the cleaning liquid 38 to be lowered, thereby enabling the cleaning liquid 38 to reach a wide range of the contaminated region (namely, the contaminated soil 18) more easily.

In the contaminant decomposition process of the contaminant-decomposing purification system 12 of the present exemplary embodiment, as illustrated in FIG. 2, contaminants that have been separated from the contaminated soil 18 (subsurface soil) in the first process of the flushing process (see FIG. 1) are decomposed by decomposer microorganisms stimulated by the activator liquid 42, thereby enabling the contaminated soil 18 (subsurface soil) to be purified. Furthermore, injecting the activator liquid 42 that has been warmed to a higher temperature than the normal groundwater temperature into the injection well 24 enables the decomposer microorganisms to be further stimulated, thereby promoting decomposition of the contaminants compared to cases in which activator liquid 42 is injected into the injection well 24 at or below the normal groundwater temperature. This enables the efficiency of purification of the contaminated soil 18 (subsurface soil) to be improved.

Moreover, in the contaminant decomposition process of the contaminant-decomposing purification system 12 of the present exemplary embodiment, warming the activator liquid 42 enables the viscosity of the activator liquid 42 to be lowered, thereby enabling the activator liquid 42 to reach a wide range of the contaminated region (namely, the contaminated soil 18) more easily.

In the subsurface soil purification method of the present exemplary embodiment, as illustrated in FIG. 1 and FIG. 2, after the flushing process has been performed by the flushing purification system 10, the contaminant decomposition process is then performed by the contaminant-decomposing purification system 12. This enables the efficiency of purification of the contaminated soil 18 (subsurface soil) in the contaminant decomposition process to be improved, enabling the time required to purify the contaminated soil 18 (subsurface soil) to be shortened. By performing the contaminant decomposition process after the contaminant concentration has been lowered by the flushing process, the action of the decomposer microorganisms is less liable to be impaired by the toxicity of the contaminants. This enables purification of contaminated soils with high concentrations of contamination, which is contaminated soil that has hitherto been difficult to purify using conventional bio-purification methods.

A subsurface soil purification method according to an exemplary embodiment of the present disclosure has been explained above.

Note that in the present exemplary embodiment, as illustrated in FIG. 2, an example has been given in which in the contaminant decomposition process, the activator liquid 42 that has been warmed to a higher temperature than the normal groundwater temperature is injected into the injection well 24 by the contaminant-decomposing purification system 12. However, configuration may be such that decomposer microorganisms that decompose contaminants contained in the contaminated soil 18 (subsurface soil) are mixed into the activator liquid 42 in the conditioning tank 40, and this activator liquid 42 is warmed to a higher temperature than the normal groundwater temperature and injected into the injection well 24. Namely, decomposer microorganisms that decompose contaminants contained in the contaminated soil 18 (subsurface soil) may be injected into the injection well 24 together with the activator liquid 42.

By applying this configuration, contaminants that have been separated from the contaminated soil 18 (subsurface soil) in the first process of the flushing process (see FIG. 1) are decomposed by the decomposer microorganisms that are mixed into the activator liquid 42 and have been stimulated by the activator liquid 42, thereby enabling the contaminated soil 18 (subsurface soil) to be purified.

Injecting decomposer microorganisms through the injection well 24 together with the activator liquid 42 enables the number of decomposer microorganisms in the contaminated soil 18 (subsurface soil) to be increased, thereby promoting contaminant decomposition. This, for example, enables decomposer microorganisms in the contaminated soil 18 (subsurface soil) to be supplemented after being depleted by the heat of the warm cleaning liquid 38 in the flushing process (see FIG. 1).

Furthermore, in the present exemplary embodiment, as illustrated in FIG. 2, an example has been given in which in the contaminant decomposition process, the activator liquid 42 that has been warmed to a higher temperature than the normal groundwater temperature is injected into the injection well 24 by the contaminant-decomposing purification system 12. However, configuration may be such that a purification agent is mixed into treated water that has been treated in the water treatment unit 30 in order to generate a purification liquid in the conditioning tank 40, the purification liquid is warmed to a temperature higher than the normal groundwater temperature by a heater or the like provided inside the conditioning tank 40, and then the warmed purification liquid is fed to the injection well 24. Namely, a purification liquid that decomposes contaminants contained in the contaminated soil 18 (subsurface soil), and that has been warmed to a higher temperature than the normal groundwater temperature may be injected into the injection well 24. It is sufficient that the purification liquid be able to decompose contaminants contained in the contaminated soil 18 (subsurface soil). Examples of purification agents mixed into treated water to generate the purification liquid include hydrogen peroxide solution and iron-based slurry.

By applying this configuration, contaminants that have been separated from the contaminated soil 18 (subsurface soil) in the first process of the flushing process (see FIG. 1) are decomposed by the purification liquid, thereby enabling the contaminated soil 18 (subsurface soil) to be purified.

Moreover, injecting purification liquid that has been warmed to a higher temperature than the normal groundwater temperature into the injection well 24 enables the rate of a reaction between the purification agent in the purification liquid and the contaminants to be increased, thereby promoting contaminant decomposition compared to cases in which purification liquid is injected into an injection well at or below the normal groundwater temperature.

Further, in the present exemplary embodiment illustrated in FIG. 1 and FIG. 2, an example has been given in which the flushing process (namely, the first process and the second process) is performed first, followed by the contaminant decomposition process. However, the contaminant decomposition process may be performed after the first process. Moreover, the contaminant decomposition process need not be performed if the contaminated soil 18 (subsurface soil) can be purified by the flushing process (namely, the first process and the second process) alone. Furthermore, the contaminants subject to purification in the flushing process (namely, the first process and the second process) and in the contaminant decomposition process may be different from each other.

An exemplary embodiment of the present disclosure has been described above. However, the present disclosure is not limited to the above exemplary embodiment in any way, and obviously various modifications may be implemented within a range not departing from the spirit of the present disclosure.

The disclosure of Japanese Patent Application No. 2016-167232, filed on Aug. 29, 2016, is incorporated in its entirety by reference herein. All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A subsurface soil purification method comprising:
  injecting a cleaning liquid into an injection well provided in the ground to separate a contaminant in subsurface soil from the subsurface soil, the cleaning liquid comprising a temperature higher than the temperature of a groundwater;

pumping up the groundwater comprising the cleaning liquid, in which the contaminant separated from the subsurface soil has been dissolved, from a pumping well that is provided in the ground so as to be spaced apart from the injection well; and injecting an activator liquid that stimulates decomposition microorganisms to decompose the contaminant into the injection well, the activator liquid comprising a temperature higher than the temperature of the groundwater;

wherein the activator liquid is injected into the injection well after injecting the cleaning liquid into the injection well.

2. The subsurface soil purification method of claim 1, further comprising injecting additional decomposition microorganisms that decompose the contaminant into the injection well together with the activator liquid.

3. The subsurface soil purification method of claim 2, wherein the activator liquid and the decomposition microorganisms are injected into the injection well after injecting the cleaning liquid into the injection well.

4. The subsurface soil purification method of claim 1, further comprising injecting a purifying liquid that decomposes the contaminant into the injection well, wherein the purifying liquid has been warmed to a temperature that is higher than the temperature of the groundwater.

5. The subsurface soil purification method of claim 4, wherein the purifying liquid is injected into the injection well after injecting the cleaning liquid into the injection well.

6. The subsurface soil purification method of claim 1, wherein the cleaning liquid is warmed to a temperature of 20° C. to 80° C.

7. The subsurface soil purification method of claim 1, wherein the cleaning liquid is warmed to a temperature of 25° C. to 60° C.

8. The subsurface soil purification method of claim 1, wherein the activator liquid is warmed to a temperature of 20° C. to 60° C.

9. The subsurface soil purification method of claim 1, wherein the activator liquid is warmed to a temperature of 20° C. to 35° C.

10. The subsurface soil purification method of claim 1, wherein the activator liquid comprises an activator selected from the group consisting of a hydrogen sustained release agent, an organic substance, a pH adjuster, and trace elements.

11. The subsurface soil purification method of claim 1, wherein the cleaning liquid comprises a surfactant.

* * * * *